United States Patent [19]

Black

[11] Patent Number: 4,913,376
[45] Date of Patent: Apr. 3, 1990

[54] VTLH AUTOGYRO

[76] Inventor: Franklin E. Black, 1681 Yellowglen Dr., Cincinnati, Ohio 45255

[21] Appl. No.: 260,800

[22] Filed: Oct. 21, 1988

[51] Int. Cl.$^4$ ............................................. B64C 27/02
[52] U.S. Cl. ..................................... 244/8; 244/17.11; 244/17.23; 244/17.25; 416/129
[58] Field of Search ............. 244/17.11, 7 R, 8, 17.23, 244/17.25, 17.27, 17.19, 23 C, 60; 416/128, 129, 170

[56] References Cited

U.S. PATENT DOCUMENTS

| | | |
|---|---|---|
| 1,403,909 | 1/1922 | Moir . |
| 1,753,112 | 4/1930 | Engledow . |
| 1,849,943 | 3/1932 | McLaughlin . |
| 1,961,996 | 6/1934 | Williams ................................ 244/8 |
| 2,192,139 | 2/1940 | Larsen ................................. 244/8 |
| 2,438,661 | 3/1948 | Grady ................................ 416/129 |
| 2,589,030 | 3/1952 | Alde ................................. 244/17.23 |
| 2,724,446 | 11/1955 | Hill ................................. 244/17.25 |
| 2,861,641 | 11/1958 | Bensen ............................. 244/17.25 |
| 3,018,068 | 1/1962 | Frost et al. ........................... 244/15 |
| 3,118,504 | 1/1964 | Cresapo ............................. 244/17.25 |
| 3,122,342 | 2/1964 | Weir ................................. 244/17.11 |
| 3,395,876 | 8/1968 | Green ................................. 244/23 |
| 3,900,176 | 8/1975 | Everett ................................ 244/6 |
| 4,195,800 | 4/1980 | Wallace ............................. 244/17.11 |
| 4,589,611 | 5/1986 | Ramme ............................. 244/17.23 |

FOREIGN PATENT DOCUMENTS

| | | | |
|---|---|---|---|
| 518476 | 5/1921 | France ............................. 416/129 |
| 842064 | 6/1939 | France ............................. 244/60 |
| 68524 | 5/1958 | France ............................. 244/23 C |
| 2179706 | 3/1987 | United Kingdom ............. 416/129 |

Primary Examiner—Galen L. Barefoot
Attorney, Agent, or Firm—Charles M. Hogan

[57] ABSTRACT

This invention relates to autogyros and to counter-rotating rotor helicopters. It further relates to compound autogyros and/or helicopters that employ a lifting surface or wing in forward flight. More specifically this invention provides an autogyro with counter-rotating rotors, circular planform wing integral with the rotors, and means for engaging power to the rotors for vertical ascent, descent and hovering.

15 Claims, 4 Drawing Sheets

VTLH AUTOGYRO

BACKGROUND OF THE INVENTION

Rotary wing aircraft can be either powered or unpowered. The unpowered version saw substantial development first. Its practical development came at the hands of Juan de la Cierva working in France shortly after the Wright Brothers. Mr. Pitcaren, an American, purchased a French gyroplane and continued to advance the state of the art. The first production models included a horizontally disposed unpowered rotor having a hub mounted upon the top of a rigid mast that was in turn rigidly affixed atop a small airplane. The airplane portion of the autogyro also employed an engine and tractor propeller for propulsion. Vertical and horizontal stabilizers as well as the wings were necessary for attitude and direction control.

Takeoff was accomplished by the Pitcaren machine by taxiing the craft at an angle of attack to allow air to pass upwardly through the rotor thus causing rotation. As the aircraft continued to move forward, rotation increased until enough lift was produced for takeoff. In reality, the distance required for takeoff was excessive. As is shown in ELEMENTS OF PRACTICAL AERODYNAMICS by Bradley Jones, M.S., John Wiley and Sons, Inc., N.Y., 1936, the rotor blade was brought up to speed prior to ground roll by a power takeoff shaft that was clutched to the propulsion engine. As rotor lift neared vehicle weight, the body of the craft would begin to rotate in response to rotor torque. At this point the power takeoff clutch was disengaged, brakes released and thrust applied to produce a reasonably short takeoff run.

A jump takeoff was accomplished by the Pitcaren machine by adding collective pitch control to the rotor blades, permitting the rotors to come up to full speed with zero lift. Since a gyroplane has no means for counteracting powered rotor torque, it was still necessary to disengage the power takeoff clutch before leaving the ground. With the rotor spinning at top speed, the collective pitch control was moved from zero to maximum lift to accelerate the craft vertically into the air using the stored energy of the rotor, while forward propulsion accelerated the craft into horizontal flight with normal autorotation ensuing.

Pitcaren also discovered that pitch and roll control could be accomplished by supporting the aircraft below the rotor like a pendulum, thus eliminating the necessity for wings and horizontal stabilizer. This brought attractive simplicity and the gyroplane became an autogyro.

As is described in the aforementioned reference, ELEMENTS OF PRACTICAL AERODYNAMICS, the gimbaled and hinged rotor with powered spin-up was the state of the art in 1936 pertaining to autogyros. Cyclic pitch was apparently added shortly thereafter. During the 1940's the Armed Forces became interested in an aircraft that could hover and even fly backward. At that time Igor Sikorsky was flying a powered rotor machine or helicopter but was blocked in development efforts because Pitcaren owned the dominating patents on rotary wing aircraft. The government subsequently ordered Pitcaren to allow Mr. Sikorsky the use of his patents in order to bring helicopter technology to the level of government objectives. As a consequence helicopters and not autogyros came into common use and remain so to this date. The fact that a helicopter can hover and an autogyro cannot hover contributed to this trend.

Now a helicopter is a powered rotary wing aircraft employing collective and cyclic pitch for stability and control and a tail rotor for antitorque and directional control. As in the autogyro, hinged rotor blades are also employed to reduce or eliminate cyclic stresses developed during forward flight. The antitorque rotor represents a sizeable power loss and developers over the years have sought to eliminate it. This can be accomplished by employing propulsion means on the rotor tips or by using counter-rotating rotors.

With respect to propulsion means on the rotor tips, a European company built an aircraft called to Rotodyne during the 1950's. It was a gyroplane that employed ramjet engines on the rotor tips for powered takeoff, hovering and descent if desired. Since ramjets cannot start themselves, propulsion engine bleed air was ducted up the mast and out the blades to activate the ramjets. During the 1960's Hughes Aircraft Co. was building a hot cycle research helicopter according to "Aviation Week and Space Technology", June 22, 1964, page (cover). Also, Hiller Aircraft Co. was testing a tip-mounted turbojet according to "Aviation Week and Space Technology," Aug. 10, 1964, page 10.

With respect to counter-rotating rotors the following U.S. Patents are representative of the prior art: 1,403,909, 1/17/1922, G. E. Moir; 1,849,943, 3/15/1932, R. J. McLaughlin; 3,395,876, 8/6/1968, J. B. Green. The U.S. Navy flew a counter-rotating coaxial shaft drone helicopter as a torpedo delivery system before rocket launched torpedoes came into use. The only practical counter-rotating helicopters utilize separate shafts for each rotor disc.

The idea of combining counter-rotating rotors and tip propulsion has also been explored in U.S. Pat. No. 4,589,611, 5/20/1986, Ramme.

The above described methods for eliminating the tail rotor of a helicopter involve considerable complexity and expense and as yet have not in commercial practice replaced the standard single rotor helicopter having a tail rotor.

The present invention seeks to achieve the simplicity of the autogyro and the performance capabilities of a helicopter. Earlier workers appreciated how difficult this was to do. If a counter-rotating rotor assembly were gimbal mounted atop an autogyro then power could be applied to or deleted from the rotor without any torque problems. Assymetric lift would cease to be a problem. The rotor blades would still have to be hinged to reduce or eliminate cyclic stresses at the hub. The blades would not be as long as those of a single rotor assembly, but would still be long enough to require a substantial vertical separation between the counter-rotating blade discs to keep the tips from running into each other. The U.S. Navy counter-rotating helicopter drone demonstrated this reality very clearly with substantial vertical separation between the rotor discs. Combining such a tall rotor assembly with a gimbal mounted fuselage gives rise to many questions concerning control forces and to my knowledge has not been attempted. I reasoned that if the vertical separation could be reduced, or for all practical purposes eliminated, and a round disc supported structure provided, then an attractive hovering autogyro efficient in forward flight could be envisioned. Elimination of the vertical separation between rotor discs would require stiff rotor blades fixedly attached to a hub. A stiff rotor blade tends to look like the wing of an aircraft in order to resist root bending moments which are cyclic. Consequently long stiff blades are not desirable.

This invention provides an autogyro incorporating a pair of closely spaced rigid counter-rotating circular planform wings or disc structures integral with closely spaced sets of peripherally distributed rotor blades with means for applying power to the rotors for vertical takeoff, landing and hovering.

SUMMARY OF THE INVENTION

This invention provides a vertical takeoff, landing and hovering autogyro incorporating a novel assembly of closely spaced counter-rotating blade discs that are gimbal mounted atop an otherwise generally conventional autogyro fuselage having cabin, propulsion means, wheels, and direction control. This invention further provides novel means for power transfer from the propulsion engine to the blade disc structures.

A primary object of this invention is to provide an autogyro having lift and power transmission units so structured and arranged as to add vertical takeoff, hovering and vertical landing capabilities to its usual functions.

Another object of this invention is to provide an autogyro with increased aerodynamic efficiency in forward flight by means of the circular planform disc units of the rotor, the circular planform disc units so closely spaced as to perform as a lifting body or wing.

Another object of this invention is to provide the autogyro with rigid rotor elements in order to resist cyclic bending stresses by (a) reducing the length of the rotor blades,
(b) increasing the number of rotor blades,
(c) transferring blade loading to the circular planform wing structure, and
(d) transferring rotor lift to the circular planform wings or rotor structures during forward flight.

A further object of this invention is to increase rotor efficiency by the reduction of tip vortices by virtue of closely spaced sets of counter-rotating tips.

Still a further object of this invention is to provide power transmission and sharing means between the blade disc units and the propulsion means for fully controlled transition flight.

Briefly this invention provides an autogyro with upper and lower counter-rotating blade disc units, means for transferring power from the propulsion engine to the lower blade disc unit without interference with the gimbal mount and means for transferring power to the upper disc unit such that the upper and lower disc units produce equal and opposite torques. This invention also provides an autogyro with variable pitch propulsion means such that when clutching or power takeoff means is engaged, almost all the engine power can be delivered to the counter-rotating blade disc units for takeoff and landing, and gradually transferred from the blade disc units to the propulsion means for transition flight. Forward flight being achieved, power takeoff means is disengaged permitting full power for propulsion in autorotation flight and unloaded rotor wing supported flight.

DESCRIPTION OF THE DRAWINGS

The above and other objects and features of the invention will be apparent to those skilled in the art, to which this invention pertains, from the following detailed description and the drawings in which.

DETAILED DESCRIPTION

Figure 1:
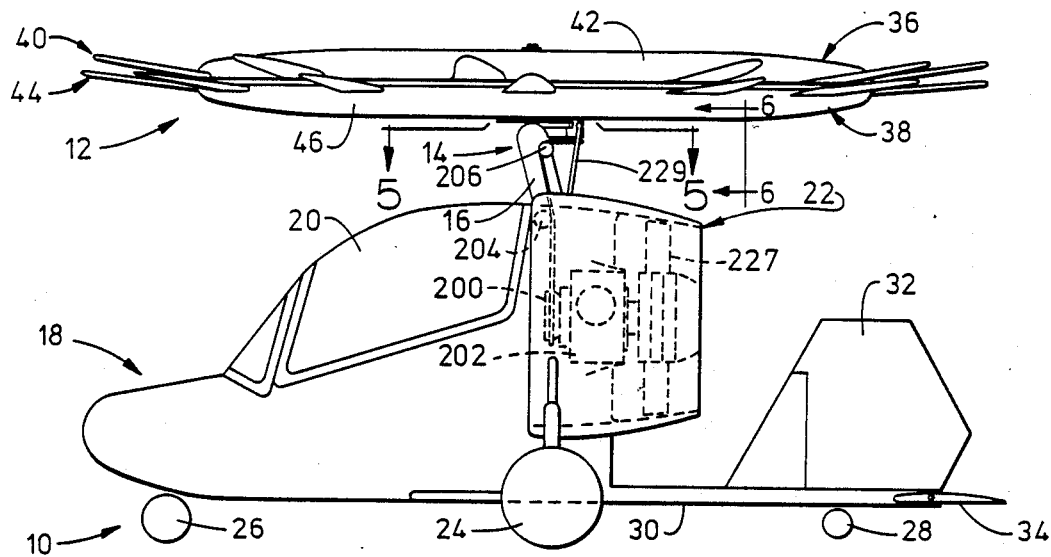
FIG. 1 is a view in side elevation of a vertical takeoff, landing and hovering autogyro constructed in accordance with an embodiment of this invention.

In the following detailed description and the drawings, like reference characters indicate like parts.

FIG. 1 shows a vertical takeoff, landing, and hovering autogyro or VTLH autogyro 10 constructed in accordance with a preferred embodiment of this invention. It is comprised of a pair of counter-rotating blade disc units collectively shown at 12, gimbal mount 14, mast 16, and fuselage group 18. The fuselage is comprised of a cabin 20, ducted fan 22, main landing gear 24, nose wheel 26, tail wheel 28, tail boom 30, rudder 32 and horizontal stabilizer 34.

The pair of counter-rotating blade disc units 12 is comprised of an upper blade disc unit 36 and a lower blade disc unit 38. The upper blade disc unit 36 incorporates an odd plurality of blades 40 fixedly attached and uniformly distributed about the periphery of an upper disc structure 42 that rotates clockwise as viewed from the top. The lower blade disc unit 38 incorporates an even plurality of blades 44 that is fixedly attached and uniformly distributed about the periphery of a lower disc structure 46 that rotates counterclockwise. In this preferred embodiment, a single seat craft, the odd plurality of blades 40 on the upper disc structure 42 numbers 11 individual blades and has a semi-span of 18 inches and an aspect ratio of 6. The upper disc structure 42 exhibits a diameter of 9 feet and a maximum thickness of approximately 5.25 inches. The even plurality of blades 44 on the lower disc structure 46 numbers 12 individual blades. The same dimensions apply to the lower blade disc unit 38 as those of the upper blade disc unit 36, the two units being separated by as small a distance as possible, the distance being measured in inches or a fraction of an inch.

The provision of odd and even numbers of blades contributes to the reduction of rotor noise. The blades of the odd and even sets of blades 40 and 44 are individually set at appropriate angles of attack (approximately 2 degrees) to cause opposed autorotations of the upper and lower blade disc units 36 and 38. Torque of the upper blade disc unit 36 is made equal to that of the lower blade disc unit 38 by differences in stage efficiency and slight modifications in blade angle of attack.

Figure 3:
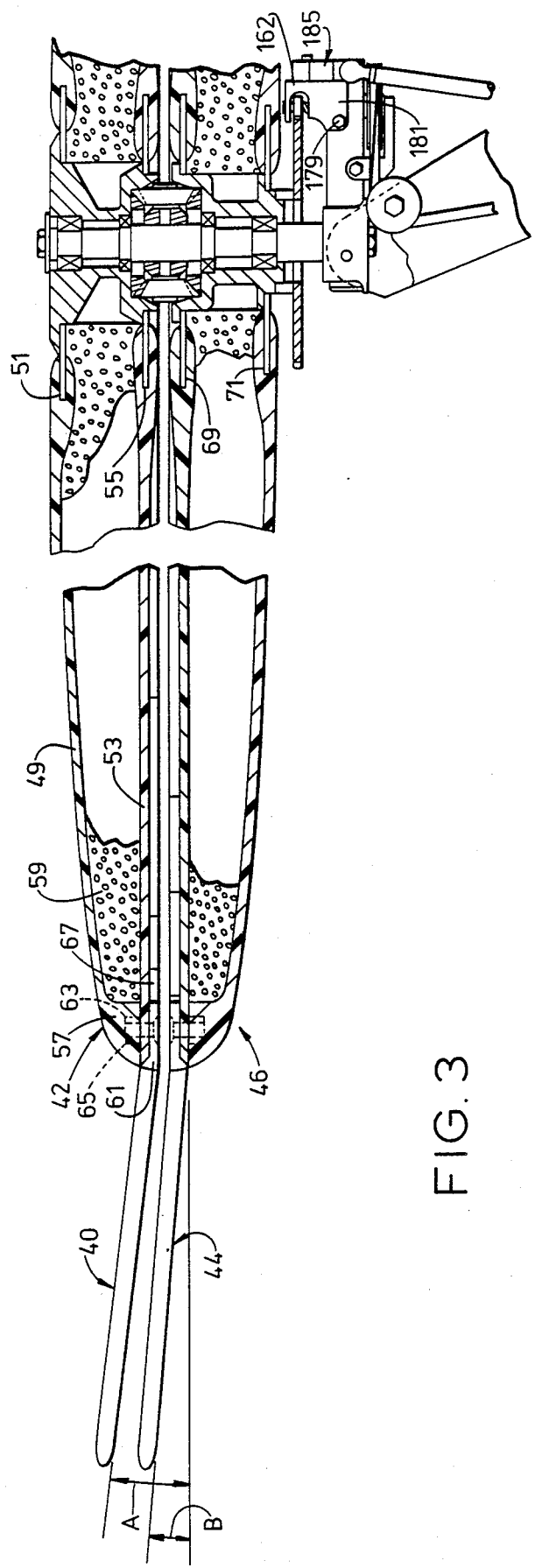
FIG. 3 is a fragmentary view taken in upright longitudinal section as taken along section line 3—3 of FIG. 2 and through the blade discs of the autogyro.

As can be seen in FIG. 3 the upper disc structure 42 is comprised of a top panel 49, a first hub ring 51, a bottom panel 53 and a second hub ring 55. The top panel 49 is constructed of a fiber or filament reinforced resin and is permanently attached to the first hub ring 51 (metal) during layup of the composite material. The fiber attachment to the first hub ring 51 can be by means of a plurality of pins provided therein or through a plurality of fiber-accepting holes provided therethrough. Such securing expedients are per se well known to those of skill in the art and need not be shown in the figures. A metal skin type construction could also be used.

The top panel 49 is slightly convex or saucer like in contour. The outer periphery of the top panel 49 is enlarged to form an integral annular element or ring 57. The bottom panel 53 is a flat round disc closure constructed of the same material as the top panel 49, and permanently attached to the second hub ring 55. Note that the second hub ring 55 is slightly smaller in inside and outside diameters as compared to the first hub ring 51. The upper surface of the outer circumference of the bottom panel 53 is chemically bonded to the lower surface of the ring 57 of the top panel 49. The chamber formed between the top panel 49 and the bottom panel 53 contains a rigid foam 59 to assure overall rigidity of the upper disc structure 42. It will be understood that a "disc unit" includes a set of blades plus the supporting "disc structure".

Figure 2:
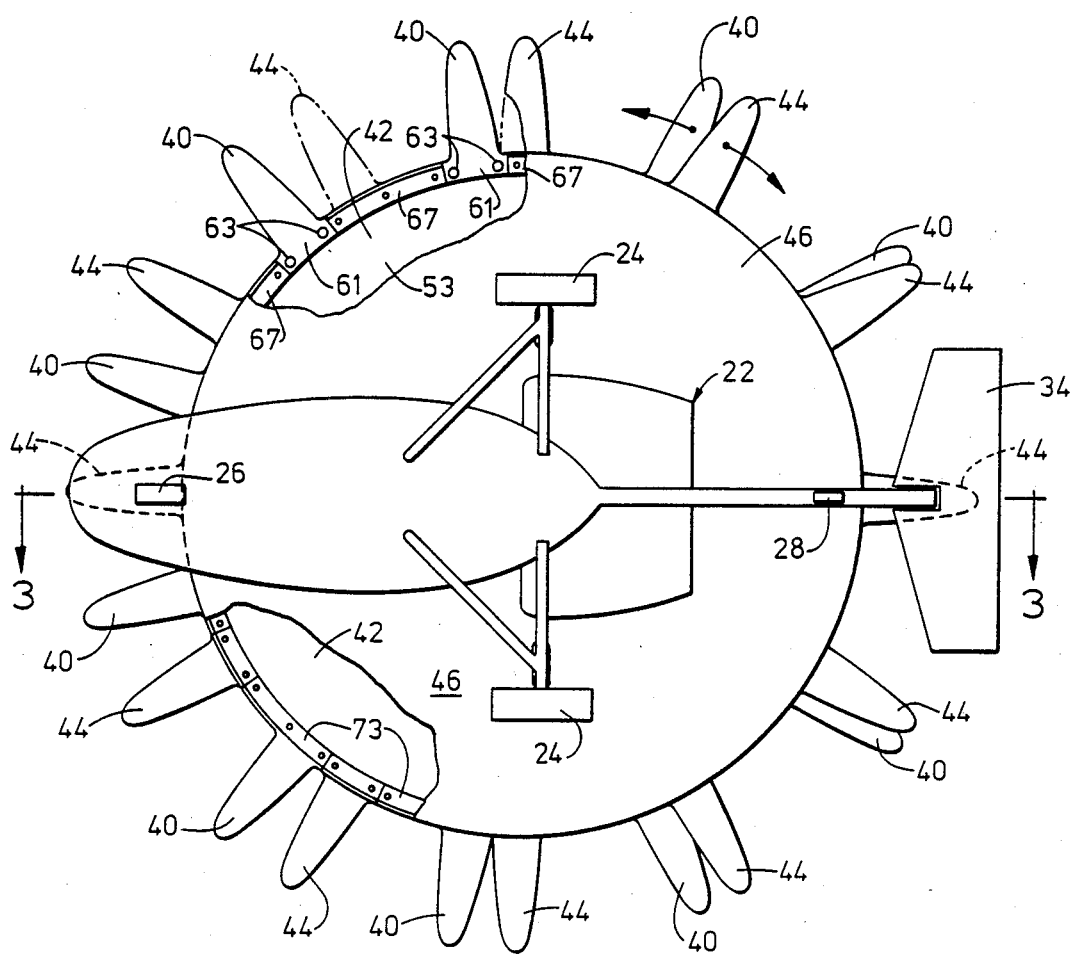
FIG. 2 is a bottom view of the autogyro shown in FIG. 1.

As is shown in FIG. 2 each blade of the plurality of blades 40 is of elliptical planform incorporating an approximately rectangular base 61 that is fixedly attached to the underside of the periphery of the upper disc structure 42 by a pair of flat head bolts 63 (shown in elevational section in FIG. 3). The pair of flat head bolts 63 pass through clear holes in the bottom panel 53 to threadably fit into metal inserts 65 molded into the ring 57 of the top panel 49. The peripheral spaces between neighboring blades (FIG. 2) are filled with a strip such as 67 each being fixedly attached to the bottom surface of the ring 57.

Again referring to FIG. 3 the lower disc structure 46 is of generally mirror image construction with respect to the upper disc structure 42. The outside and inside diameters of a third hub ring 69 and a fourth hub ring 71 are progressively smaller to accomodate hub assembly. Also, the even plurality of blades 44 is fixedly attached to the periphery of the lower disc structure 46 in the same manner as the odd plurality of blades 40 is attached to the upper disc structure 42. As is shown in FIG. 2, rub strips 73 are fixedly attached between each blade of the even plurality of blades 44.

The rub strips 67 and 73 provide means to prevent rotor damage or serious rpm degradation in the event that some inflight aerodynamic loadings could cause disc flexures large enough to produce disc interference. Other means such as rollers could be employed to achieve the same result.

The lower disc structure 46 comprises a lower panel and an upper closure, corresponding respectively to the top and bottom panels 49 and 53 of the upper disc structure 42, with the same provision for rigid assembly. The odd plurality of blades 40 on the upper disc structure 42 incorporates a dihedral angle "A" while the even plurality of blades 44 on the lower disc structure 46 incorporates a dihedral angle "B" to provide the craft with some inherent roll stability in sideslip. Angles "A" and "B", selected in response to a desired level of roll stability and manuvering performance, might be in the order of 5 and 5½ degrees respectively. Dihedral angles "A" and "B" are different to assure that mechanical interference does not occure between blades. Note that the lower disc of the upper blade disc unit 36 is closely spaced in relation to the upper disc of the lower blade disc unit 38.

Figure 4:
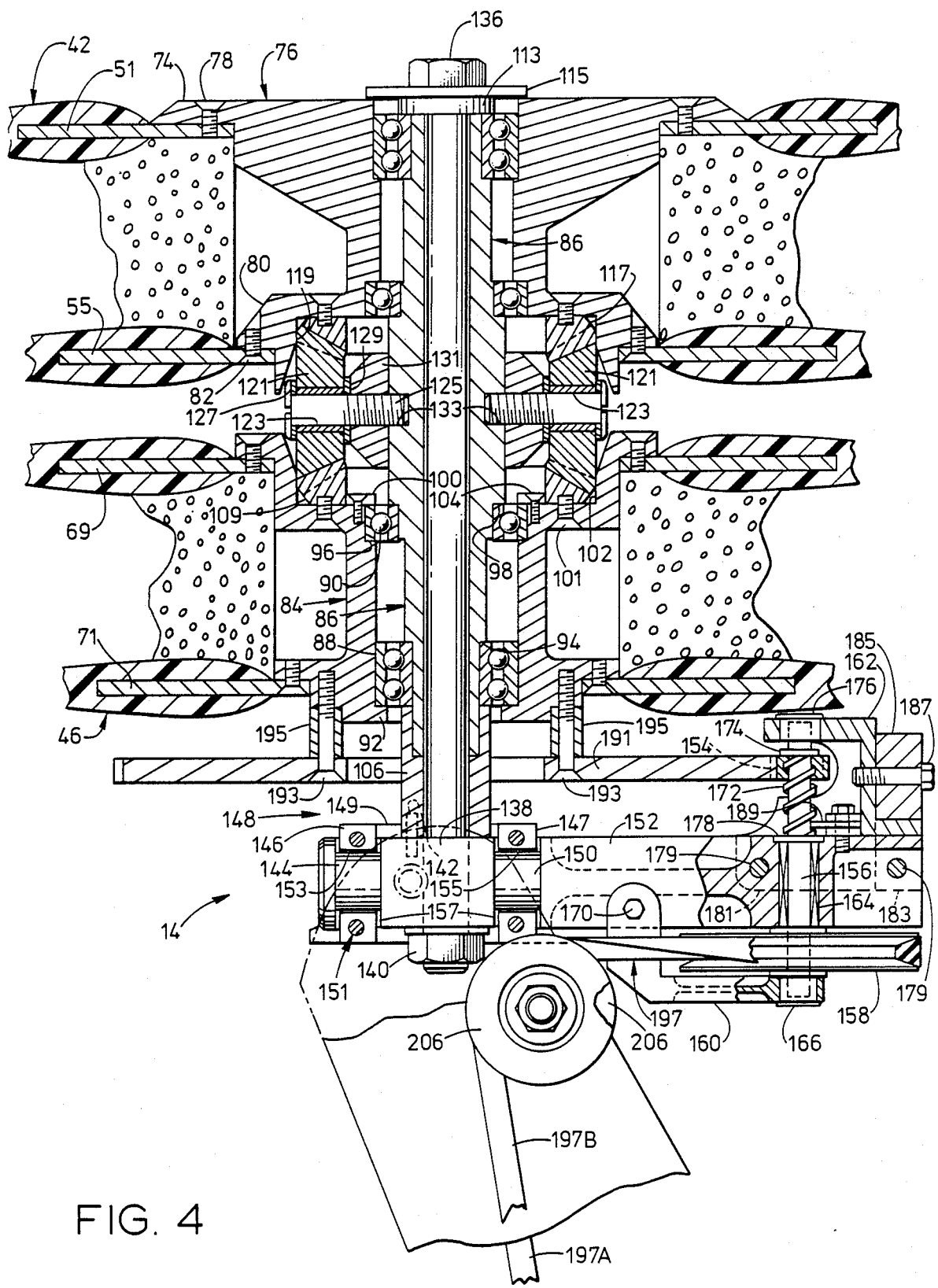
FIG. 4 is a elevational view of the disc hub assembly taken in section in the plane of symmetry, this view further showing the gimbal mount, with aircraft support member being cut away for clarity.

Referring now to FIG. 4 the first hub ring 51 of the upper disc structure 42 is fixedly attached to a first flange 74 of an upper hub 76 by a plurality of flat head screws 78 that pass downwardly through clear holes in the periphery of the first flange 74 to threadably fit into threaded holes about the inside diameter of the first hub ring 51. The second hub ring 55 of the upper disc structure 42 is fixedly attached to a second flange 80 of the upper hub 76 by a plurality of flat head screws 82 that pass upwardly through clear holes about the inside diameter of the second hub ring 55 to threadably fit into threaded holes spaced about the outer diameter of the second flange 80.

The lower disc structure 46 is fixedly attached to a lower hub 84 in the same manner as the upper disc structure 42 is attached to the upper hub 76. The neighboring proximate flanges of the upper and lower hubs 76 and 84 respectively differ in outer diameters so that the hub rings are assembled to reside adjacent the bottom surfaces thereof, thus carrying all lift forces on the flanges and not on the fasteners. Lower hub 84 is rotatably mounted upon the lower end of a spindle 86 by means of a double row ball bearing 88 and a single row ball bearing 90. Double row ball bearing 88 is retained in the lower hub 84 by a flange 92, and is retained upon the spindle 86 by shoulder 94. Similarly the single row ball bearing 90 is retained in the lower hub 84 by a hub shoulder 96, and upon the spindle 86 by a second shoulder 98. The lower hub 84 is retained upon the double and single row ball bearings 88 and 90 and respectively by a retaining ring 100 that is in turn fixedly attached within the bottom of a counterbore 102. Flat head screws 104 pass through clear holes in the retaining ring 100 to fit into threaded holes in the bottom surface of the counterbore 102 of the lower hub 84. The lower hub 84 and its bearings are retained upon the spindle 86 by a bottom spacer 106 that is retained upon the bottom end of the spindle 86 by being clampedly mounted to the top of the gimbal mount 14 as will be described hereinafter. A lower ring gear 109 is also fixedly attached in the bottom of the counterbore 102 by flat head screws 101 that pass upwardly through clear holes in the lower hub 84 to fit into threaded holes in the lower ring gear 109.

The rotatable mounting of the upper hub 76 is essentially a mirror image of the lower hub 84, its bearings being retained upon the spindle 86 by a top spacer 113 that incorporates a flange 115. The flange 115 is employed as a dirt cover for the bearings of the upper hub 76. An upper ring gear 117 is fixedly attached within a counterbore 119 in opposition to the lower ring gear 109 of the lower hub 84. A pair of bevel gears 121 cooperate with the upper ring gear 117 and the lower ring gear 109 to cause counter rotation of the upper disc structure 42 with respect to the lower disc structure 46, in fact counter-rotation of the upper and lower blade disc units 36 and 38. Each member of the pair of bevel gears 121 incorporates a bushing 123, compressively fitted into the bore thereof, to facilitate rotation upon a bolt 125. The bolt 125 passes through a thrust washer 127, the bushing 123 and bevel gear 121, through a second thrust washer 129 to fit into a spindle ring 131. The spindle ring 131 is compressively fitted about the midsection of the spindle 86 and is prevented from rotating thereabout since the bolts 125 extend through the spindle ring 131 and into clear holes 133. Bolts 125 extend to the bottom of the clear holes 133 thus locking them in place. Bolts 125 are long enough to provide sufficient clearance for the free rotation of bevel gears 121.

A long bolt 136 passes downwardly through the top spacer 113, spindle 86, bottom spacer 106, and through a roll block 138 from which it extends sufficiently to accomodate a hub nut 140 with locking means. The bottom spacer 106 is restrained from rotation by a pin 142 besides being compressively retained between the double row ball bearing 88 and the roll block 138.

Protruding from the forward face of the roll block 138 is a cylindrical extension 144 that is bearinged through a front wall 146 of a pitch box 148. Also protruding from the aft wall of the roll block 138 is a cylindrical extension 150 that is bearinged through an aft wall 147 of the pitch box 148. Integral and coextensive with the cylindrical extension 150 is a pitch/roll arm 152 that extends aftward to accomodate a spur gear 154, helical shaft 156, pulley 158, bottom shaft support bracket 160 and top shaft support 162.

The helical shaft 156 is vertically disposed and rotatably mounted in needle bearings 164 that are in turn mounted through the aft portion of the pitch/roll bar 152. The bottom end of the helical shaft 156 resides in a closed end needle bearing 166 that is in turn compressively mounted in the aft end of the bottom shaft support bracket 160. The bottom shaft support bracket 160 is an "L" shaped member as viewed in FIG. 4. Its forward or vertical leg rises upwardly to cooperate closely with the bottom and sides of the pitch/roll bar 152 to which it is fixedly attached by means of a bolt and nut 170. In this manner the bottom shaft support forms a fixed end support for the helical shaft 156 with the use of a single bolt.

The upper portion of the helical shaft 156 incorporates a helical thread set 172 and a stop shoulder 174. The bottom of the the helical thread set 172 resides on the top surface of a thrust washer 178 that is in turn mounted in a counterbore in the top of the pitch/roll arm 152. The top extremity of the helical shaft 156 is retained in a top closed end needle bearing 176 that is in turn compressively mounted in the upper cover of the top shaft support 162.

Figure 5:
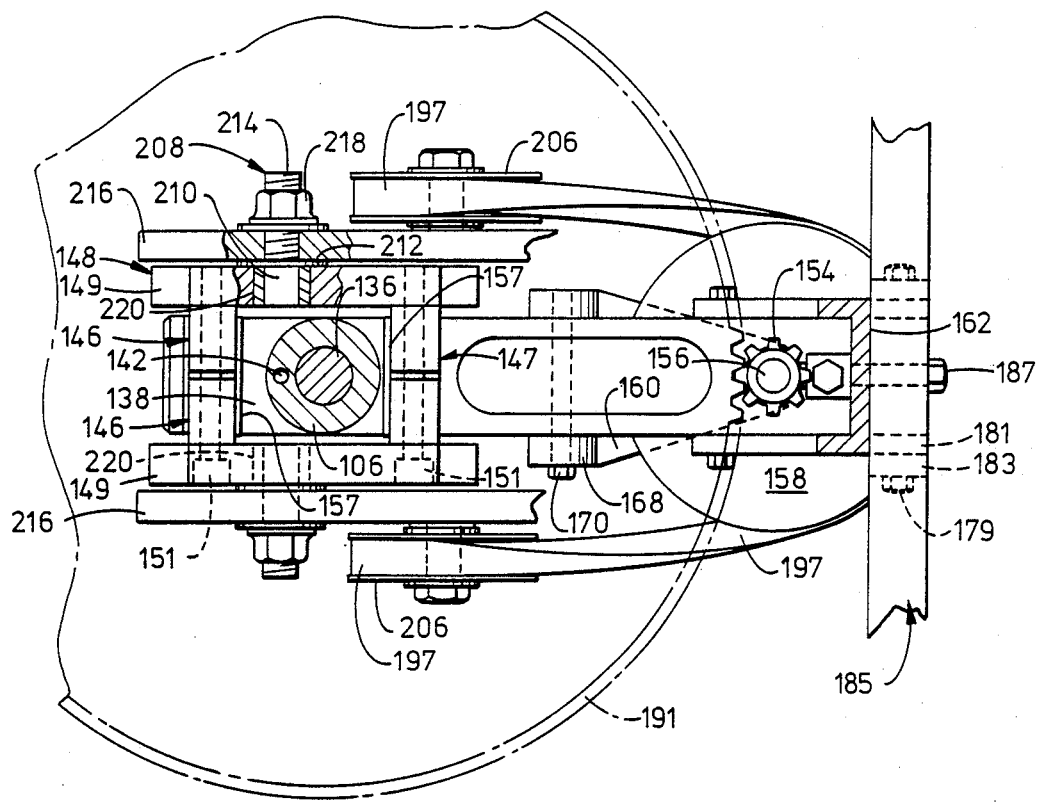
FIG. 5 is a sectional view of the gimbal mount of the aircraft taken along line 5—5 in FIG. 1.
Figure 6:
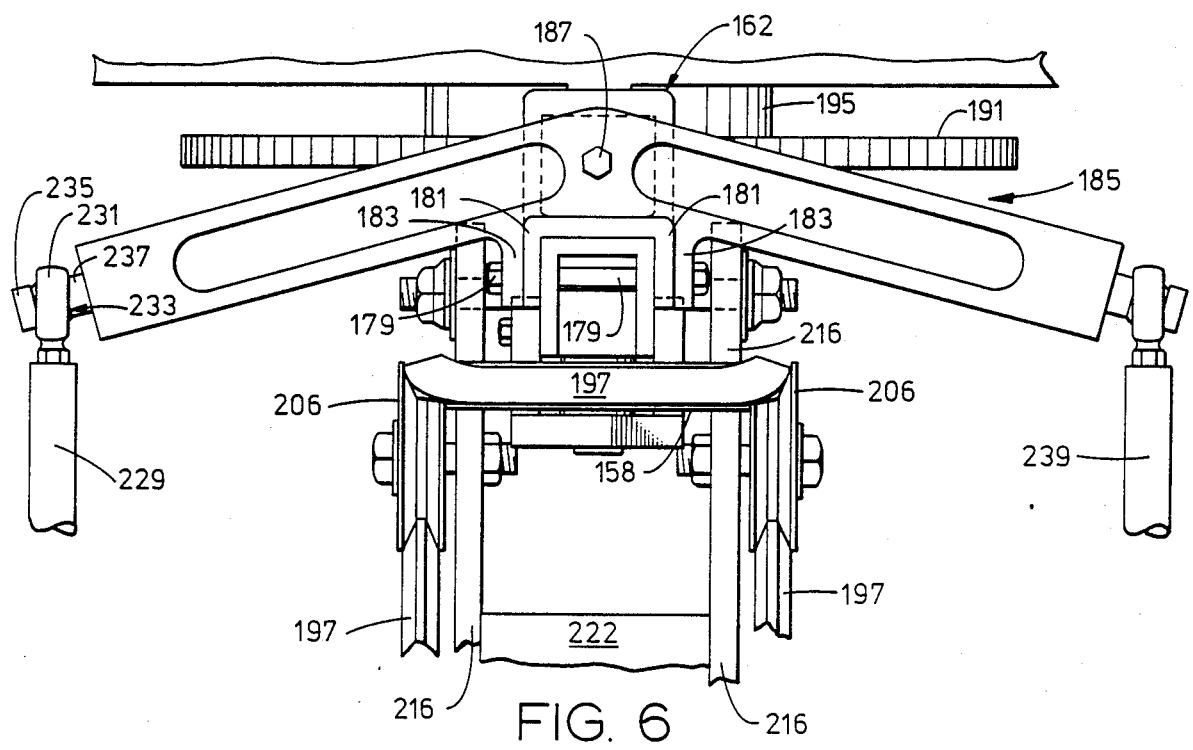
FIG. 6 is a rear elevational view of the gimbal mount taken along line 6—6 in FIG. 1.

The top shaft support 162 is a four sided guard like structure that is fixedly attached to the aft end of the pitch/roll arm 152 by means of a pair of bolts 179 that pass through clear holes in downwardly extending sides 181 thereof (also FIGS. 5 & 6). The rearmost bolt of the pair of bolts 179 also cooperates with downwardly entending flanges 183 of a transverse control bar 185 to fixedly attach both the top shaft support 162 and the transverse control bar 185 to the pitch/roll arm 152. The transverse control bar 185 is further secured to the assembly by means of a bolt 187 that passes longitudinally through a clear hole in the central portion thereof to fit into the rear wall of the upper portion of the top shaft support 162. Fixedly mounted to the top surface of the pitch/roll arm 152, but inside the confines of the guard like structure of the top shaft support 162, is a brush 189 as shown in FIG. 4. The figure also shows the spur gear 154 engaged with a disc gear 191 that is in turn fixedly attached by bolts 193 to the lower hub 84 and spaced downwardly therefrom by a cylindrical standoff 195.

The arrangement of the helical shaft 156, spur gear 154, brush 189, and disc gear 151, forms a rotative speed sensitive clutch that engages when the helical shaft 156 is rotated and disengages when the disc gear 151 rotates the spur gear 154 at a speed higher than the helical shaft 156.

As was previously described, the roll block 138 with cylindrical extensions 144 and 150 is mounted through the front wall 146 and the aft wall 147 respectively of the pitch box 148. The front and aft walls 146 and 147 are held in parallel spaced relationship with each other by sides 149 as is best shown in FIG. 5. The front and aft walls 146 and 147 respectively are made in halves as shown. A set of four bolts 151 (FIGS. 4 & 5) pass laterally through clear holes in the port member of the sides 149 of the pitch box 148, through clear holes in both halves of the front and aft walls 146 and 147 respectively to threadably fit into the starboard member of the sides 149. The set of four bolts 151 are tightened appropriately to bring the halves of the front and aft walls 146 and 147 respectively to bear upon a front bearing 153 and an aft bearing 155. The front and aft bearings 153 and 155 respectively are constructed of a plastic material and are of the flange type. The roll block 138 is held in longitudinal spaced relationship between the front and aft walls 146 and 147 by a pair of thrust washers 157 that are also made of a plastic material.

The pitch box 148 pivots on two trunnion pins 208. Trunnion pins 208 incorporate a clear shaft portion 210, flange 212, and threaded shank 214. Each trunnion pin 208 is fixedly mounted through a clear hole in an upper plate 216 by means of washer and lock nut 218 such that the clear shaft portions 210 extend inwardly. The opposed clear shaft portions 210 of the trunnion pins 208 reside in bushings 220 that are compressively mounted in the port and starboard sides 149 of the pitch box 148. The upper plates 216 are fixedly attached in parallel spaced relationship to the upper end of a mast beam 222 that is illustrated in FIG. 6 only.

Continuing with FIG. 6, a port control rod 229 rises substantially vertically from within the rearward confines of the cabin 20 (FIG. 1) to pivotally attach to the left extremity of the transverse control bar 185 by means of rod end 231, spherical bearing 233, fastener 235 and spacer 237. Fastener 235 passes through the bore of spherical bearing 233 and through a clear hole in the spacer 237 to threadably mount into the left extremity of the transverse control bar 185. A starboard control rod 239 likewise rises substantially vertically to pivotally mount upon the right extremity of the transverse control bar 185 in the same manner as, but in mirror image to the port control bar 229. The lower ends of the port and starboard control rods 229 and 239 are pivotally attached to prior art linkages that are in turn connected to a standard control stick in the cabin 20. As the pilot pulls rearward on the upper end of the control stick, the port and starboard control rods 229 and 239 move downwardly causing the fuselage 18 to swing rearwardly about the two trunnion pins 208 of the gimbal mount 14. Moving the center of gravity rearward causes the craft to pitch upwardly into a climbing attitude. As the pilot pushes forward on the upper end of the control stick, the port and starboard control rods 229 and 239 move upwardly causing the fuselage 18 to swing forwardly about the two trunnion pins 208 of the gimbal mount 14. Moving the center of gravity forward causes the craft to pitch downwardly into a decending attitude. Moving the control stick to the right causes the starboard control rod 239 to move downwardly and the port control rod 229 to move upwardly thus swinging the fuselage 18 to the starboard side about the cylindrical extensions 144 and 150 of the gimbal mount 14. This moves the center of gravity of the craft to the right which initates a right hand side slip, and in conjunction with the rudder precipitates a right hand turn. A left hand turn is opposite the functions of the right hand turn just described. The gimbal mount 14 allows simultaneous control functions so that flight performance can be fully integrated.

Pulley 158 (FIGS. 1, 4, 5 & 6) is keyed to the lower end of the helical shaft 156 and receives power from a power takeoff belt 197. The power takeoff belt 197 communicates with a clutch 200 that is functionally affixed to the rear of an engine 202. The engine 202 is mounted in pusher configuration just behind the cabin 20 as is shown in FIG. 1. The power takeoff belt 197 is maintained in proper place by a pair of lower guide pulleys 204 and a pair of upper guide pulleys 208. The pair of lower guide pulleys 204, being mounted behind the cabin 20, maintain the power takeoff belt 197 in working alignment with the clutch 200. The pair of upper guide pulleys 206, being mounted on the port and starboard sides of the mast 16, maintain the belt 197 in working alignment with the pulley 158. The pulley 158 moves relative to the mast 16 in pitch and roll. In roll it tilts from side to side about the longitudinal centerline of the pitch/roll arm 152, and in pitch it moves up and down along an arc defined by trunnion pins 208. The power takeoff belt 197 is flexible enough to conform to the limited pitch and roll movements built into the gimbal mount 14.

The engine 202 turns a variable pitch ducted fan 227 as is shown in FIG. 1. Pitch on the fan must be variable from zero to takeoff thrust. Full feathering could also be an asset in case of engine failure.

OPERATION

The engine 202 is started and allowed to warm up at idle speed. The variable pitch blades 227 of the ducted fan 22 are set to zero thrust during warmup and in preparation for vertical takeoff procedure. When the craft is ready for takeoff, clutch 200 is engaged which causes power takeoff belt 197 to circulate clockwise (when viewed from the top) about pulley 158 which turns helical shaft 156 and spur gear 154. At rest the spur gear 154 resides upon the top surface of thrust washer 178. Brush 189 retards rotation of the spur gear 154 giving it an impetus to climb helical thread set 172 to engage disc gear 191 and deliver rotational power to the pair of counter-rotating blade disc units 12. Engine speed is increased at a reasonable rate to maximum setting to achieve takeoff power and vertical acceleration. The pair of counter-rotating blade disc units 12 does not rotate fuselage 18. Hovering performance is achieved by judiciously setting back the throttle.

Transition to forward flight is achieved by increasing the pitch of the variable pitch blades 227 in a smooth manner. As forward speed increases, lift on the upper and lower disc structures 42 and 46 respectively increases, decreasing the demand for lifting horsepower, thus making more power available for thrust. The pilot will integrate the power transfer from lift to thrust until the VTLH autogyro 10 has achieved sufficient forward speed for the pair of counter-rotating blade disc units 12 to supported flight. The power takeoff clutch 200 is then disengaged, the helical shaft 156 comes to a stop and spur gear 154 is motivated down the helical gear set 172 by the rotation of the disc gear 191. The pair of counter-rotating blade disc units 12 continue to rotate in autogyration, that is, by the upward passage of air through the odd and even sets of blades 40 and 44 respectively. The rudder 32 sets the heading of the VTLH autogyro 10 in forward flight while the horizontal stabilizer 34 trims the pitch attitude of the pair of counter-rotating blade disc units 12 as a function of forward velocity.

Transfer to hovering flight from autogyration is achieved by engaging the power takeoff clutch 200 which drives the spur gear 154 into engagement with the disc gear 191. Spur gear 154 must be rotating faster than disc gear 191 for engagement. The pilot will manage both engine 202 rpm and the pitch of variable pitch blades 227 to produce the required schedule of rpm's for engagement of the spur gear 154. After engagement power can be transferred from propulsion to lift to produce hovering and vertical descent. Note that vertical descent is controlled by power setting which is atipical of a helicopter.

CONCLUSION

It has been shown that the invention comprises a VTLH autogyro 10 with a fuselage group 18 having vertical ascent, hovering, and descent capabilities along with conventional takeoff and flight characteristics comprising in combination:

an upper disc structure 42 and a lower disc structure 46, mounted in such close proximity to each other as to form a single aerodynamic lifting body, an odd plurality of blades 40 uniformly distributed about and fixedly secured to the periphery of the upper disc structure 42 and an even plurality of blades 44 evenly distributed about and fixedly secured to the periphery of the lower disc structure 46, the disc structures being mounted upon a single spindle 86 and driven in counter-rotation by a pair of bevel gears 121 in conjunction with a lower ring gear 109 and an upper ring gear 117, a disc gear 191 for coupling the lower disc structure 46 to a drive train, the drive train including a first clutch means comprising a helical thread set 172, spur gear 154 and brush 189, the first clutch means being of the type that disengeges when unloaded or by pilot command, the drive train further including a second clutch 200, power transfer belt 197, and pulley 158 affixed to the lower end of a helical shaft 156 incorporating helical thread set 172 for selectively engaging and disengaging the power train from an engine 202, a gimbal mount 14 secured to spindle 86 and a mast 16 secured to fuselage group 18 for providing two degrees of controlled rotational freedom between the fuselage 18 and the pair of counter-rotating blade disc units 12 including its mounting means, a forward flight propulsion means comprising ducted fan 22 with variable pitch blades 227 for controllable forward thrust, and power supply means coupled to said drive train and said flight propulsion means.

It has been shown that the invention further comprises a pair of counter-rotating blade disc units 12 adapted to be secured to gimbal mount 14 that is fixedly attached in proper relation atop the fuselage 18 of an autogyro 10 for the purpose of enlarging its performance to include vertical ascent, hovering, and vertical descent capabilities, in combination:

an upper disc structure 42 being rigid,
a lower disc structure 46 being rigid, an odd plurality of blades 40 uniformly distributed about and fixedly secured to the periphery of the upper disc structure 42, an even plurality of blades 44 evenly distributed about and fixedly secured to the periphery of the lower disc structure 46, said disc structures mounted upon a single spindle 86 and driven by a pair of bevel gears 121 in conjunction with lower and upper ring gears 109 and 117 respectively to cause counter-rotation of the upper blade disc unit 36 and the lower blade disc unit 38, a gimbal mount 14 secured between the pair of counter-rotating blade disc units 12 and fuselage group 18 for providing fuselage group 18 with the freedom of a two dimensional pendulum for shifting the center of gravity of the craft to obtain pitch and roll control and, coupling means comprising disc gear 191, secured below the lower disc structure 46, in cooperation with spur gear 154, helical shaft 156, pulley 158 and transfer belt 197, to apply power to the pair of counter-rotating disc structures.

The VTLH autogyro 10 illustrated in the drawings and described above is subject to structural modification without departing from the spirit and scope of the appended claims.

Having described my invention, what I claim as new and desire to secure by letters patent is:

1. A lift rotor assembly adapted to be gimbal mounted in relation to the fusilage body of an autogyro for the purpose of enlarging its performance capability to include hovering and vertical ascent and descent comprising, in combination:
   an upper rigid circular disc structure having a flattened dome-like profile and closed by a flat disc,
   a lower rigid circular disc structure having a flattened dome-like profile and closed by a second flat disc,
   a first set of blades uniformly distributed about and secured to the periphery of said upper disc structure,
   a second set of blades uniformly distributed about and secured to the periphery of said lower disc structure,
   both sets of blades being wind-driven, and
   means for mounting and gearing together said disc structures for counter-rotation on a common axis, with the structures in mirror image relation and the discs so close together that the two structures cooperatively form an airfoil with auto-gyrating capability.

2. An autogyro formed with a fuselage body and having vertical ascent, hovering and descent capabilities along with conventional flying and take-off capabilities comprising, in combination:
   a pair of rigid, circular lift disc structures, one upper and one lower, mounted so close as to perform as a single aerodynamic lifting body,
   individual sets of blades uniformly distributed around and secured to the respective peripheries of said disc structures,
   disc mounting means including a single shaft for mounting and gearing together said disc structures for counter-rotation,
   a gimbal mounting secured to said shaft and a mast secured to said body for providing two degrees of controlled rotational freedom between fuselage and the assembly of disc structures and their mounting means,
   means for coupling said lower disc structure to a drive train, this drive train including a
      first clutch of the type which disengages when unloaded or at the command of and operator,
      the drive train further including a second clutch for selectively engaging and disengaging the power train from a power supply means,
   power supply means coupled to said drive train,
   forward flight-propulsion means, adjustable to provide a range of thrust,
   a coupling between the power-supply means and said flight-propulsion means.

3. An autogyro according to claim 2 in whch the gimbal mounting comprises;
   a roller having a longitudinal axis fore and aft and secured to said shaft to permit controlled roll between body and the disc structure assembly including said shaft, and
   a pitch box providing a journal for said roller, said box having an axis transverse to said body and
   means for mounting said pitch box on said mast for controlled rotation about said transverse axis to permit controlled pitch between body and the disc structure assembly.

4. In an autogyro having a fusilage, a novel airfoil assembly spaced from the fusilage and comprising, in combination:
   a rigid upper plano-convex rotor structure, circular in plan,
   a rigid lower plano-convex rotor structure, circular in plan,
   each of said rotor structures having wind-driven peripheral blades short in length compared to the diameter of said structures, and
   means for mounting and gearing together said structures for counter-rotation on a common axis in mirror image relation and with the adjacent flat surfaces of the structures so closely spaced that the remote convex surfaces provide a single airfoil with auto-gyrating capability.

5. In an autogyro, the combination of:
   a fusilage body,
   a rotor pair comprising two rigid circular structures each profiled with a
      a flat face and
      a convex airfoil surface,
   peripheral blade sets on said structures,
   said structures being disposed with their faces so close together that their convex surfaces form a single aerodynamic wing,
   means for mounting and gearing said rotor pair for counter-rotation on a common axis,
   gimbal means securing said mounting means to said body, and
   means in said body for controlling the tilt of said rotor pair relative to said body.

6. In an autogyro of the type including a fusilage body, gimbal connector, forward-flight propulsion means, and rotor-tilt control means, an improved rotor assembly distinct from the body comprising, in combination:
   upper and lower rigid circular blade-bearing rotor structures profiled and positioned to have closely spaced inner faces and curved outer faces, and
   means secured to the connector for mounting and gearing the rotor structures together on a common axis so that the curved surfaces comprise a single airfoil, the curved surfaces being continuous except as the mounting means requires interruption.

7. In an aircraft having a body and with the capability of auto-gyrating, a rotor assembly distinct from the body comprising, in combination:
a pair of structurally rigid circular rotors each bearing peripheral wind-driven blade elements,
the rotors being formed with conforming inner faces and curved outer surfaces, and
means mounting and gearing said rotors for counter-rotation on a common axis with the conforming faces spaced so closely together that the curved surfaces form a single airfoil,
the curved surfaces being continuous except as the mounting means requires interruption.

8. In an aircraft having a body and with the capability of auto-gyrating, the combination of:
forward flight propulsion means, and
a rotor assembly distinct from the body comprising
a pair of structurally rigid circular rotors each having wind-driven blade elements projecting from its periphery,
the rotors being formed with conforming inner faces and curved outer surfaces, and
means mounting and gearing said rotors for counter-rotation on a common axis with the conforming faces so close together that the curved surfaces provide a single airfoil,
the curved surfaces being continuous except as the mounting means requires interruption.

9. In an aircraft having a body and with the capability of auto-gyrating, the combination of:
a gimbal connector for the body,
a rotor assembly distinct from the body and secured to the gimbal connector comprising
a pair of structurally rigid circular rotors each bearing wind-driven blade elements projecting from its periphery,
the rotors being profiled with conforming inner faces and curved outer surfaces, and
means mounting said rotors for geared contrarotation on a common axis with the conforming faces spaces so close that the curved surfaces provide a single airfoil, and
rotor-tilt means in said body.

10. The combination in accordance with claim 9 in which the spacing between the faces is in the inches order, down to less than one inch.

11. The combination in accordance with claim 9 in which the dihedral angles formed by geometrical intersections of the faces, if flat, and the blades remote and proximate to the body are, respectively, 5 and 5.5 degrees.

12. The combination in accordance with claim 9 in which the diameters of the rotors with their blades are on the order of nine feet.

13. The combination in accordance with claim 9 in which the angle of attack of the blades approximates two degrees.

14. An aircraft having a fusilage body and auto-gyrating, vertical lift and descent, forward flying and takeoff capabilities, comprising, in combination:
a pair of rigid coaxial lift structures, one upper and one lower, each lift structure having a circular periphery and profiled to provide a curved surface and a face,
said lift structures being positioned with their faces so close that the structures are effectively a single airfoil,
individual sets of fixed blades uniformly distributed on and secured to the respective peripheries of said lift structures,
lift structure mounting means having a single axis for mounting and gearing together said lift structures for counter-rotation on said axis,
the curved surfaces and faces of said lift structures being continuous and uninterrupted except as required by the mounting means,
gimbal means for securing the mounting means to said body,
forward propulsion means in said body,
means in said body for supplying variable power to said forward propulsion means on command of the pilot,
means subject to command of the pilot for applying variable power from a source in the body to drive said lift structures, and
means accessible from the body for controlling the tilt of the lift structures.

15. An aircraft in accordance with claim 14 in which the means for applying variable power to drive the lift structures includes an overrunning clutch responsive to speed of the lift structures or command of the pilot.

* * * * *